United States Patent
Zhang et al.

(10) Patent No.: US 12,518,413 B2
(45) Date of Patent: Jan. 6, 2026

(54) INTERPOLATING IMAGE AND/OR AUDIO IN PLURAL PASSES THAT USE DIFFERENT CONFIGURATIONS

(71) Applicant: Microsoft Technology Licensing, LLC, Redmond, WA (US)

(72) Inventors: Ruixiong Zhang, Dover, MA (US); Xiaoyuan Yang, Pleasanton, CA (US); Jeremy David Berman, Cambridge, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1009 days.

(21) Appl. No.: 17/566,883

(22) Filed: Dec. 31, 2021

(65) Prior Publication Data
US 2023/0215031 A1 Jul. 6, 2023

(51) Int. Cl.
*G06T 7/62* (2017.01)
*G06F 17/17* (2006.01)

(52) U.S. Cl.
CPC ............... *G06T 7/62* (2017.01); *G06F 17/17* (2013.01); *G06T 2207/20216* (2013.01)

(58) Field of Classification Search
None
See application file for complete search history.

(56) References Cited

U.S. PATENT DOCUMENTS

| | | | | |
|---|---|---|---|---|
| 5,659,365 A | * | 8/1997 | Wilkinson | H04N 11/044 348/E5.066 |
| 6,282,243 B1 | * | 8/2001 | Kazui | H04N 19/523 375/E7.26 |

(Continued)

FOREIGN PATENT DOCUMENTS

| CN | 106597575 B | 3/2019 |
|---|---|---|
| CN | 107239856 B | 5/2020 |

(Continued)

OTHER PUBLICATIONS

"Barnes Interpolation," available at https://en.wikipedia.org/wiki/Barnes_interpolation, Wikipedia article, accessed on Dec. 14, 2021, 3 pages.

(Continued)

*Primary Examiner* — Nancy Bitar

(57) ABSTRACT

A computer-implemented technique is described herein for interpolating input data that includes image and/or audio content. The technique identifies plural sizes associated with different respective phenomena exhibited by the input data. The technique then interpolates the input data in a pipeline that includes plural passes. The plural passes are controlled using plural respective parameter values. The plural respective parameter values, in turn, are selected based on the plural respective sizes, arranged from largest to smallest. In other implementations, the technique chooses pass-specific algorithmic changes to be applied by the interpolation algorithms used by the different passes. In other implementations, the technique chooses its configurations without regard to sizes of phenomena that may be exhibited in the input data. The technique is advantageous because it reduces the presence of artifacts in output data produced by the computer-implemented technique.

19 Claims, 7 Drawing Sheets

(56) References Cited

U.S. PATENT DOCUMENTS

| | | | |
|---|---|---|---|
| 7,400,762 B2* | 7/2008 | Munsil | H04N 1/4053 |
| | | | 382/162 |
| 10,324,004 B2 | 6/2019 | Boggio | |
| 10,816,688 B2 | 10/2020 | Ramirez-Perez et al. | |
| 10,871,593 B2 | 12/2020 | Spatzierer | |
| 10,983,249 B2 | 4/2021 | Mashhoori | |
| 11,570,455 B2* | 1/2023 | Yin | H04N 19/59 |
| 2003/0194011 A1* | 10/2003 | Srinivasan | H04N 19/523 |
| | | | 375/E7.26 |

FOREIGN PATENT DOCUMENTS

| | | |
|---|---|---|
| CN | 111611541 A | 9/2020 |
| EP | 1353513 A2 | 10/2003 |
| EP | 1353513 A3 | 10/2003 |
| KR | 101818568 B1 | 1/2018 |

OTHER PUBLICATIONS

"Needham, MA," accessible at https://www.msn.com/en-us/weather/maps/airquality/, MSN Maps, Microsoft Corporation, Redmond, WA, accessed on Jan. 23, 2022, 1 page.

Bashmachnikov, et al., "Temperature-salinity distribution in the northeastern Atlantic from ship and Argo vertical casts," in Ocean Sci., No. 11, 2015, pp. 215-236.

"Wavelet transform," available at https://en.wikipedia.org/wiki/Wavelet_transform, Wikipedia article, accessed on Dec. 14, 2021, 10 pages.

Google Patents English translation of Korean Patent Document No. KR101818568B1, available at https://patents.google.com/patent/KR101818568B1/en?oq=101818568, accessed on Feb. 1, 2022, 14 pages.

Google Patents English translation of Chinese Patent Document No. CN106597575A, available at https://patents.google.com/patent/CN106597575A/en?oq=106597575, accessed on Feb. 1, 2022, 9 pages.

Google Patents English translation of Chinese Patent Document No. CN107239856A, available at http://patents.google.com/patent/CN107239856A/en?oq=107239856, accessed on Feb. 1, 2022, 7 pages.

Google Patents English translation of Chinese Patent Document No. CN111611541A, https://patents.google.com/patent/CN111611541A/en?oq=111611541, accessed on Feb. 1, 2022, 10 pages.

Espacenet published abstract for KR101818568B1, available at https://worldwide.espacenet.com/publicationDetails/biblio?CC=KR&NR=101818568B1&KC=B1&FT=D&ND=4&date=20180117&DB=&locale=en_EP, European Patent Office, accessed on Feb. 1, 2022, 1 page.

Espacenet published abstract for CN106597575B, available at https://worldwide.espacenet.com/publicationDetails/biblio?CC=CN&NR=106597575B&KC=B&FT=D&ND=4&date=20190329&DB=&locale=en_EP, European Patent Office, accessed on Feb. 1, 2022, 1 page.

Espacenet published abstract for CN107239856B, available at https://worldwide.espacenet.com/publicationDetails/biblio?CC=CN&NR=107239856B&KC=B&FT=D&ND=4&date=20200512&DB=&locale=en_EP, European Patent Office, accessed on Feb. 1, 2022, 1 page.

Espacenet published abstract for CN111611541A, available at https://worldwide.espacenet.com/publicationDetails/biblio?II=0&ND=3&adjacent=true&locale=en_EP&FT=D&date=20200901&CC=CN&NR=111611541A&KC=A, European Patent Office, accessed on Feb. 1, 2022, 1 page.

Search Report and Written Opinion for PCT/US2022/044963, mailed Jan. 2023, 17 pages.

Suzuki, et al., "Residual Learning of Video Frame Interpolation Using Convolutional LSTM," in 2020 25th International Conference on Pattern Recognition (ICPR), Jan. 2021, pp. 1499-1504.

Cressman, George P., "An Operational Objective Analysis System," available at https://journals.ametsoc.org/view/journals/mwre/87/10/1520-0493_1959_087_0367_aooas_2_0_co_2.xml, Monthly Weather Review, vol. 87, No. 10, Jan. 15, 1960, pp. 367-374.

* cited by examiner

OVERVIEW OF OPERATION OF THE COMPUTING SYSTEM
402

RECEIVE INPUT DATA, THE INPUT DATA INCLUDING A SET OF OBSERVATIONS PRODUCED BY AT LEAST ONE DATA CAPTURE DEVICE.
404

IDENTIFY PLURAL CONFIGURATIONS FOR PLURAL RESPECTIVE PASSES OF AN INTERPOLATION OPERATION BASED ON ONE OR MORE SELECTION FACTORS.
406

INTERPOLATE THE INPUT DATA IN A PIPELINE THAT INCLUDES THE PLURAL PASSES, TO PRODUCE OUTPUT DATA, THE PLURAL PASSES USING THE PLURAL RESPECTIVE CONFIGURATIONS THAT HAVE BEEN IDENTIFIED, WHEREIN, THROUGH USE OF THE PLURAL RESPECTIVE CONFIGURATIONS, INTERPOLATION PERFORMED IN AT LEAST ONE OF THE PLURAL PASSES REDUCES ARTIFACTS INTRODUCED IN AT LEAST ONE PRECEDING PASS.
408

PRODUCE INFORMATION BASED ON THE OUTPUT DATA, TO BE PRESENTED BY ONE OR MORE PRESENTATION DEVICES.
410

FIG. 4

OVERVIEW OF OPERATION OF THE COMPUTING SYSTEM
502

RECEIVE INPUT DATA, THE INPUT DATA INCLUDING A SET OF OBSERVATIONS PRODUCED BY AT LEAST ONE DATA CAPTURE DEVICE.
504

IDENTIFY PLURAL SIZES ASSOCIATED WITH DIFFERENT RESPECTIVE PHENOMENA EXHIBITED BY THE INPUT DATA.
506

INTERPOLATE THE INPUT DATA IN A PIPELINE THAT INCLUDES PLURAL PASSES, TO PRODUCE OUTPUT DATA, THE PLURAL PASSES USING PLURAL RESPECTIVE PARAMETER VALUES TO PERFORM INTERPOLATION, EACH PARTICULAR PASS FOLLOWING A FIRST PASS OF THE PLURAL PASSES USING A PARTICULAR PARAMETER VALUE THAT IS ASSOCIATED WITH A SMALLER SIZE COMPARED TO AN IMMEDIATELY-PRECEDING PASS.
508

PRODUCE INFORMATION BASED ON THE OUTPUT DATA, TO BE PRESENTED BY ONE OR MORE PRESENTATION DEVICES.
510

FIG. 5

INTERPOLATING IMAGE AND/OR AUDIO IN PLURAL PASSES THAT USE DIFFERENT CONFIGURATIONS

BACKGROUND

Data capture devices do not always provide complete information for a phenomenon under consideration. For example, consider the case in which a set of data capture devices are distributed unevenly across a geographic region. The observations produced by these devices may unevenly represent what is happening in different parts of the geographic region. To remedy this problem, a developer may produce a computer model that simulates the observations across the entire geographic area. However, the task of producing such a computer model may require a significant amount of labor and computing resources. Further, such a computer model may not provide satisfactory output results in all cases. For example, the computer model may produce simulated observations that do not match the ground-truth observations produced by the data capture devices, at those locations in which those ground-truth observations are available.

A developer may alternatively use an interpolation algorithm to produce information for those parts of the geographic region that are not well represented by the original observations. But this solution can also produce unsatisfactory results. For example, common interpolation techniques can produce output results that contain artifacts. The artifacts may be manifested in unwanted lines and/or geometrical shapes that appear in the output results.

SUMMARY

A computer-implemented technique is described herein for interpolating input data that includes image and/or audio content. In some implementations, the technique identifies plural sizes associated with different respective phenomena exhibited by the input data. The technique then interpolates the input data in a pipeline that includes plural passes. The plural passes are controlled using plural respective parameter values. The plural respective parameter values, in turn, are selected based on the plural respective sizes, arranged from largest to smallest. That is, a first pass operates using a parameter value that is based on a largest size, a second pass operates using a parameter value that is based on a next-largest size, and so on. The technique is advantageous because it reduces the kinds of artifacts that are present in the output data produced by other kinds of interpolation techniques. The technique also captures and preserves details across a range of phenomena having different sizes.

In other implementations, the technique more generally chooses a configuration for each pass based on one or more factors. The "configuration" of a pass encompasses the above-identified case in which the technique selects a parameter value for a pass based on a size associated with an identified phenomenon in the input data; but it is not so limited. In other cases, the technique can choose a parameter value irrespective of its correlation with a particular size. Alternatively, or in addition, the technique can choose algorithmically different interpolation methods for different respective passes. Still other configuration options are possible.

The above-summarized technology can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 4 shows a process that represents an overview of one manner of operation of the computing system of FIG. 1.

FIG. 5 shows a process that represents one instantiation of the process of FIG. 4.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computing system for interpolating image data. Section B sets forth illustrative methods which explain the operation of the computing system of Section A. And Section C describes illustrative computing functionality that can be used to implement any aspect of the features described in Sections A and B.

A. Illustrative Computing System

Figure 1:
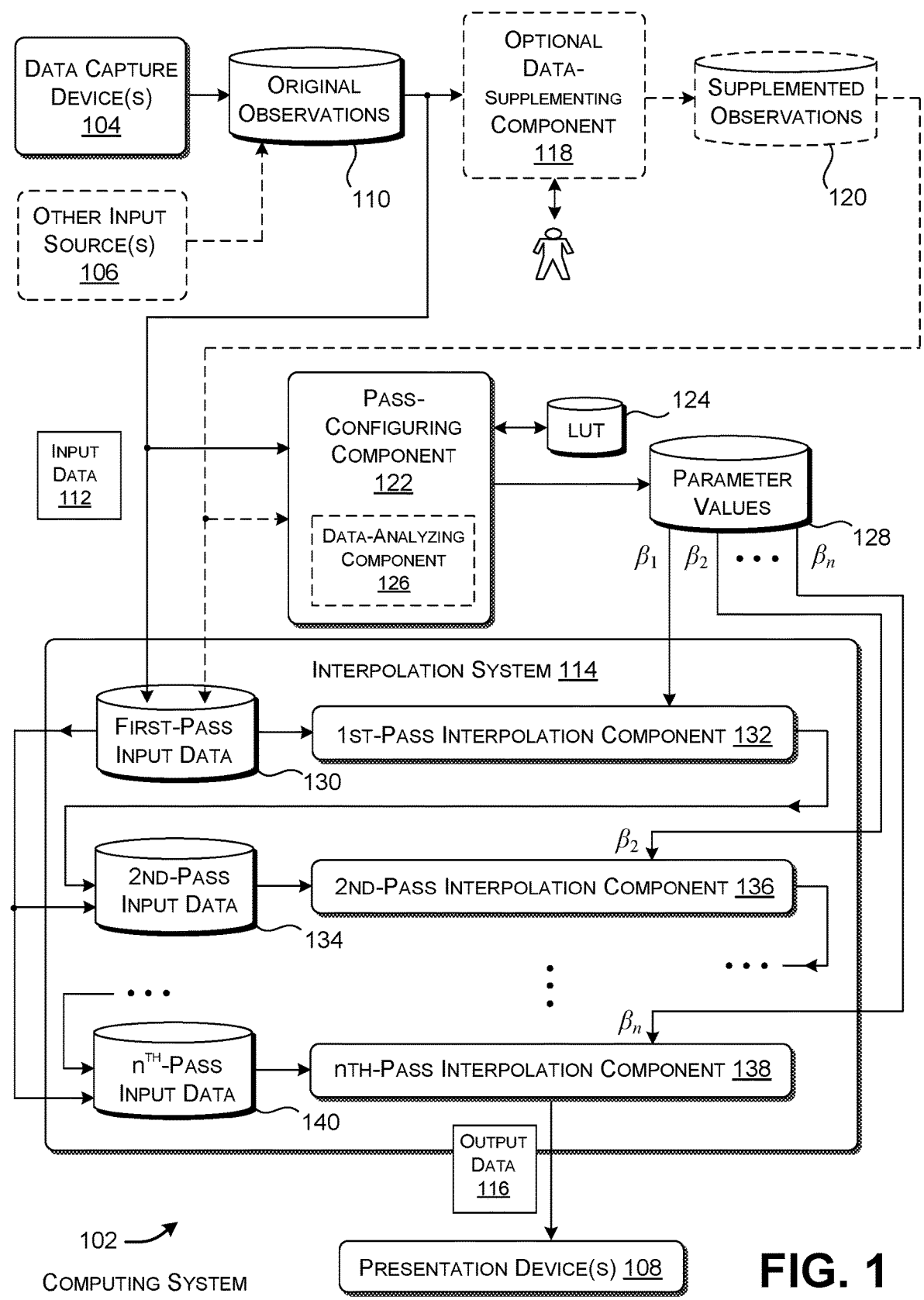
FIG. 1 shows an illustrative computing system that interpolates input image data that contains image and/or audio content.

FIG. 1 shows a computing system 102 that interpolates input data. The input data originates from one or more data capture devices 104 and/or other input source(s) 106. In some implementations, for example, the data capture devices 104 may represent measurements stations dispersed across a geographic region. The measurement stations may capture any local meteorological conditions, such as temperature, wind speed, precipitation, humidity, barometric pressure, pollution levels, etc. In some implementations, the data capture devices 104 are unevenly distributed across the geographic region. This means that some parts of the geographic regions are underrepresented by the observations made by the data capture devices 104, relative to other regions.

In other implementations, the data capture devices 104 may include one or more image capture devices that capture one more images. For example, an image capture device may capture an image using a charge coupled device sensor. In other implementations, the data capture devices 104 may include one more audio-capture devices (e.g., microphones) that capture audio content.

In other implementations, the other input source(s) 106 may represent a computer-implemented model that produces simulated observations. In other implementations, the other input source(s) 106 may represent an "upstream" interpolation algorithm that produces interpolated output results. The computing system 102 accepts the output results of this upstream interpolation algorithm as input data. The computing system's own interpolation system (described below) further refines the input data. These examples of the data capture devices 104 and other input source(s) 106 are set forth herein in the spirit of illustration, not limitation; other implementations can receive input data from yet other kinds of sources.

In some cases, the input data may include image and/or audio content. The input data is said to include image content when the input data serves as the basis for presenting one or more images on one or more presentation devices 108. For example, the observations produced by a series of meteorological stations can be construed as having image content insofar as this raw data serves as a basis for presenting an image of some weather phenomenon on a display device of any type. The input data is said to include audio content when this input data serves as the basis for presenting audio information on the presentation device(s) 108. For example, the observations produced by one or more microphones can be construed as audio content insofar as this raw data serves as the basis for presenting sounds via a speaker of any type. In other cases, the input data does not include image or audio content. For example, the input data may represent message traffic information that exhibits two or more underlying trends of different scopes, and the presentation device(s) 108 provide the output data in numerical form. To facilitate description, however, the following examples will most often emphasize those cases in which the original observations include image content that is used to produce one more images on the presentation device(s) 108.

The input data can include any number N of dimensions, such as one dimension, two dimensions, or three or more dimensions. A data store 110 stores the input data in any form. For instance, consider the following example of one-dimensional input data. At least one data capture device can record a series of temperature readings over time. The presentation device(s) 108 can present output data on the basis of this input data in the form of an image that shows variation of temperature over time. More specifically, the presentation device(s) 108 can present its output data as variations of color along a timeline, etc.

Consider the following example of two-dimensional input data. Plural data capture devices 104 can capture temperature readings at different locations within a geographic region. The presentation device(s) 108 can present output data on the basis of this input data in the form of an image that shows temperature various across the geographic region. More specifically, in some cases, the presentation device(s) 108 can present this output data in the form of variations of color across a two-dimensional map of the geographic region. In another case, a camera can capture a two-dimensional image as input data. The presentation device(s) 108 can present a two-dimensional output image that represents the interpolated counterpart of the input image.

Consider the following example of three-dimensional input data. The data capture device(s) 108 can capture temperature at different locations in a geographic region across a span of time. The presentation device(s) 108 can present output data that shows temperature across the geographic region at different times. More specifically, the presentation device(s) 108 can present this output data as a three-dimensional image model that shows a series of two-dimensional maps of the geographic region arranged along a time axis. Other examples of multi-dimensional input data can originate from video cameras, medical imaging equipment, depth-sensing devices, etc.

As one option, FIG. 1 shows a scenario in which input data 112 that originates from the data store 110 feeds into an interpolation system 114. The interpolation system 114 subsequently operates on the input data 112, to produce output data 116 that is presented by the presentation device(s) 108.

In another mode of operation, a user may interact with an optional data-supplementing component 118 to modify the original observations in the data store 110. This yields supplemented observations which are stored in another data store 120. Here, the input data 112 represents the supplemented observations stored in the data store 120. The interpolation system 114 performs interpolation on the input data 112, which has the end effect of smoothly assimilating and integrating the corrections made by the user into the original observations. By virtue of this effect, the user can use the data-supplementing component 118 to "tune" the original observations in any manner by selectively correcting parts of the input data.

More specifically, in the case of image content, a user may adjust any characteristic of a group of pixels in a two-dimensional input image, e.g., by changing the colors associated with the pixels, the intensities associated with the pixels, the transparencies associated with the pixels, and so on. The resultant observations stored in the data store 120 will include the original two-dimensional image with the corrections made by the user. In the case of audio content, a user may adjust any characteristic of a part of an audio stream, e.g., by changing the volume, pitch, etc. of an identified span of audio content in the audio stream. The resultant observations stored in the data store 120 will include the original audio content with the corrections made by the user.

Alternatively, or in addition, an algorithm can automatically make changes to the original observations. For example, a computer algorithm can automatically detect a group of pixels in an input image that exhibit the phenomenon of red eye. The computer algorithm can then alter the group of pixels in the image to reduce this effect. To nevertheless facilitate explanation, the remainder of this explanation will assume that the interpolation system 114 operates on input data 112 that represents the original observations stored in the data store 110.

A pass-configuring component 122 performs preliminary operations prior to interpolation. For instance, in some implementations, the pass-configuring component 122 determines characteristic sizes associated with the input data 112. A characteristic size refers to a scope of at least one phenomenon that is represented by the input data. The size can be measured in different ways depending on the kinds of phenomena expressed by the input data. For example, the size may be expressed as a maximum or average length across a phenomenon (e.g., measured in meters, etc.), a height or range of heights of the phenomenon (e.g., measured in meters, etc.), the area encompassed by or otherwise associated with the phenomenon (e.g., measured in square meters, etc.), the volume encompassed by or otherwise associated with the phenomenon (e.g., measured in cubic meters, etc.), and on. Alternatively, or in addition, the size may be expressed as a duration of some phenomenon in the dimension of time (e.g., measured in seconds, etc.). For example, the size may describe how long a particular frequency characteristic exists within audio data, how long a weather phenomenon lasts, the separation between two identified geophysical events, the separation between two identified phenomes or words in a stream of audio data, etc. However, to simplify and facilitate explanation, most of the examples set forth below will assume that a characteristic size describes an identified spatial length associated with a phenomenon, such as the maximum or average diameter of a weather phenomenon being studied.

As appreciated by the present inventors, the input data 112 may capture different phenomena that are associated with different characteristic sizes. For example, assume that the input data 112 describes cloud cover and precipitation across an entire country or continent. The weather across such a broad expanse can include phenomena having a relatively small size, such as a tornado, which typically has a diameter between 50 meters and 1,000 meters. In contrast, hurricanes can have an average size of 500 kilometers. Similarly, different weather phenomenon can have different durations. For example, a storm front can have a duration of several days, while other phenomenon can take place over an entire season. Still other phenomenon reoccurs at an interval that spans several years, such as the El Niño phenomenon. A single instance of the input data 112 may capture evidence of plural of these phenomena, layered on top of each together and, in some cases, interacting with each other.

The pass-configuring component 122 can identify the characteristic sizes in different ways. In one approach, the pass-configuring component 122 can consult one or more reference sources provided in a data store 124 to identify the characteristic sizes. For example, the data store 128 can include a lookup table that identifies the typical phenomena and the characteristic sizes of different regions. Such a lookup table may be indexed based on location of the region under consideration, time, and any other relevant contextual factor(s). In operation, the pass-configuring component 122 can perform a lookup operation in the lookup table to determine the sizes associated with the current input data 112 under consideration, e.g., based on the time at which the input data 112 was captured, the location(s) at which the input data 112 was captured, etc. A community of researchers may contribute to the information provided in the lookup table, e.g., by adding new information to the lookup table, correcting inaccurate information, and so on.

In addition, or alternatively, the pass-configuring component 122 can rely on a data-analyzing component 126 to automatically extract the characteristic sizes associated with the input data 112. The data-analyzing component 126 can perform its analysis on the single instance of input data 112, or a more encompassing body of information that is related to the phenomena expressed by the input data 112. For example, assume that the input data 112 describes temperature variations over a particular region in the month of December. The data-analyzing component 126 can perform its analysis on just this input data 112 or a compendium of data that expresses the weather in December in this particular region over the last ten years.

The data-analyzing component 126 can use different techniques, including, but not limited to: Fourier analysis; wavelet analysis; Principal Component Analysis (PCA), machine-trained models, etc. For example, with respect to a stream of audio data, Fourier analysis and/or wavelet analysis can identify the different waveforms that compose the audio data. The data-analyzing component 126 can then extract characteristic lengths associated with the identified components it has identified. For example, a characteristic length may be associated with the amplitude of a waveform, the frequency of a waveform, the duration of a waveform, and so on.

As a final task, the pass-configuring component 122 maps the characteristic sizes it has identified to associated parameter values ($\beta_1$, $\beta2$, . . . , $\beta_n$). As will be explained below, these parameter values govern the operation of different passes of interpolation performed by the interpolation system 114. In some implementations, the pass-configuring component 122 consults a mapping table (not shown) to perform this function. The mapping table maps a plurality of sizes to appropriate parameter values. A developer or community of researchers may create and maintain this mapping table. In other implementations, the pass-configuring component 122 can consult any other type of mapping tool to perform this mapping function. The mapping tool may be implemented as a mathematical function, a heuristic mapping rule or algorithm, a machine-trained model, etc.

In some cases, a parameter value directly expresses an associated size. For example, upon determining the presence of a weather phenomenon having a length of 200 meters, the pass-configuring component 122 chooses a parameter value that directly expresses a length of 200 meters, or a scaled expression of this length. In other cases, a parameter value may have a less direct connection with a size that it represents. Again consider the case of the weather phenomenon having a length of 200 meters. The pass-configuring component can choose a maximum degree of polynomials (for the case in which the interpolation system 114 uses polynomial interpolation), or can choose a maximum depth level of a decision tree (for the case in which the interpolation system 114 performs interpolation using a decision tree or a random forest of decision trees), etc. In these examples, the parameter value has a bearing on the level of precision in which interpolation is performed. Different levels of precision, in turn, can capture phenomena having different characteristic scopes. Additional information regarding how parameter values may influence the operation of the interpolation system 114 will be provided below in the context of the explanation of FIG. 2.

A data store 128 stores the parameter values. The data store 128 may also order the parameter values based on the sizes of the phenomena they represent, from largest to smallest. For example, the data store 128 can identify the parameter value $\beta_1$ as a first parameter value in the ordered set of parameter values because it represents the phenomenon having the largest size. The data store 128 can identify the parameter value $\beta_n$ as the last parameter value because it represents the phenomenon having the smallest size.

Now referring to the interpolation system 114 itself, this component can be characterized as a pipeline of interpolation passes. Each pass other than the first pass receives input data, in part, from its preceding pass, and supplies output data to a subsequent pass (if any). The last pass of interpolation provides the output data 116 for presentation by the presentation device(s) 108. Further, the passes are governed by parameter values associated with decreasing scope. That is, the first pass is governed by the first parameter value $\beta_1$ associated with the largest size, while the last pass is governed by the last parameter value $\beta_n$ associated with the smallest size. In some implementations, the number of sizes identified by the pass-configuring component 122 can change over time, depending on changes of the phenomena being studied. Accordingly, the interpolation system 114 can dynamically expand and contract its pipeline to expand and contract the length of its processing pipeline in a corresponding manner.

Note that FIG. 1 shows that the interpolation system 114 includes a series of discrete and separate components associated with different respective passes. This indeed reflects one possible way to implement the interpolation system 114. In other implementations, the interpolation system 114 can implement its passes using a single piece of logic that is called on for each pass and fed a pass-specific parameter value. In these cases, the illustration of the interpolation system 114 in FIG. 1 is a "rolled out" depiction of a single piece of logic that is invoked plural times.

Referring now to the configuration and operation of the interpolation system 114 in greater detail, a data store 130 stores first-pass input data $X_1$. Each instance $x_k$ of the first-pass input data $X_1$ describes an original observations $y_k$ provided in the data store 110 captured at a respective location $D_k$, where $1 \leq k \leq m$. Alternatively, the first-pass input data may reflect the supplemented observations stored in the data store 120; but again, to simplify explanation, assume that the first-pass input data reflects the original observations in the data store 110.

A first-pass interpolation component 132 performs any type of interpolation operation F on the first-pass input data, governed by the first parameter value $\beta_1$, to produce interpolated output data $I_1(D)$. Mathematically expressed, the first-pass interpolation component 132 performs the operation of: $I_1(D)=F(D, X_1, \beta_1)$. Additional information regarding the interpolation operation performed by each interpolation component will be set forth below in greater detail, e.g., in conjunction with the explanation of FIGS. 2 and 3.

A data store 134 stores second-pass input data that includes a combination of the first-pass input data and difference data $X_2$. Again, the first-pass input data includes the original observations provided in the data store 110 captured at respective locations. The difference data $X_2$ expresses the difference between the original observations and the counterpart interpolated values produced by the first-pass interpolation component 132, at corresponding locations. That is, each instance $x_{2,k}$ of the difference data $X_2$ may be expressed as $y_k-I_1(D_k)$, where $1 \leq k \leq m$. More generally stated, the difference data $X_2$ expresses the residual between the original observations and the interpolated observations produced by the first-pass interpolation component 132.

A second-pass interpolation component 136 performs an interpolation operation that depends the first-pass interpolated output data $I_1(D)$, the difference data $X_2$, and the second parameter value $\beta_2$. Mathematically expressed, the second-pass interpolation component 136 produces second-pass output data $I_2(D)$ given by $I_1(D)+F(D, X_2, \beta_2)$. In other words, the second-pass interpolation component 136 modifies the first-pass interpolated output data $I_1(D)$ on the basis of a supplemental interpolation operation performed on the difference data $X_2$ and the second parameter value $\beta_2$. Note that the second-pass interpolation component 136 can generate the difference data $X_2$, or some other component of the interpolation system 114 can produce this data.

The interpolation system 114 can repeat the same operation of the second-pass interpolation component zero, one, or more times. FIG. 1 shows the last pass n of the pipeline of interpolation passes. The last pass includes an nth-pass interpolation component 138 that operates on nth-pass input data provided in a data store 140. In general, at any given pass j (other than the first pass), an interpolation component performs the following operation to produce jth-pass interpolated output data: $I_j(D)=I_{j-1}(D)+F(D, X_j, \beta_j)$. This means that the jth-pass interpolation component modifies the previous pass's interpolated output data $I_{j-1}(D)$ by a supplemental interpolation performed on the basis of the jth-pass difference data $X_j$ and the jth-pass parameter value $\beta_j$. The output data 116 represents the interpolated output data produced by the nth-pass.

The computing system 102 can successively improve its output results through learning. For example, the computing system 102 can assess the quality of each instance of output data 116 that it generates. For example, the computing system 102 can use a detector having a filter that is configured to detect the presence of telltale artifacts in the output data 116. Here, quality reflects an amount of artifacts present in the output data 116. The computing system 102 can also apply other detectors that assess other characteristics of the output data 116, such as the sharpness of its details, e.g., which can be assessed using a Peak Signal to Noise Ratio (PSNR) metric, a Structural Similarity Index Measure (SSIM) metric, etc. The pass-configuring component 122 can memorialize the results of its quality tests in any way, e.g., by recording this information in the lookup table stored in the data store 124 (which maps instances of input data to sizes) and the mapping table (which maps combinations of sizes to sets of parameter values). Further, the pass-configuring component 122 can refine its stored results for a particular kind of input data upon encountering a new combination of parameter values that yields better results, e.g., as a result of performing tests on another instance of the same kind of input data. For example, the pass-configuring component 122 may iteratively refine its assessment of an optimal combination of parameter values to use when modeling the weather of a particular region at a particular time of the year. When processing any instance of input data, the pass-configuring component 122 will use whatever combination of parameter values is currently regarded as optimal for that kind of input data.

In some implementations, the pass-configuring component 122 can optionally also use real-time optimization when choosing a set of parameter values for an individual instance of input data 112. For example, the pass-configuring component 122 can perform different test run optimizations using different combinations of parameter values. The pass-configuring component 122 can then select the combination of parameter values that yields the highest quality results, e.g., based on the metrics described above. This optimization method uses a grid search approach, but the pass-configuring component 122 can use other search strategies to find an optimal combination of parameter values.

Overall, through its use of pass-driven interpolation, the interpolation system 114 successfully blends together different details of the phenomena expressed in the input data 112, without allowing any level of detail to obscure other levels of detail. This has the effect of capturing and preserving detail across different scopes of analysis. This has the further effect of reducing artifacts in the final output data 116. For example, while the first interpolation pass might produce first-pass output data that contains some artifacts, subsequent passes may remove or lessen the impact of these impacts. The subsequent passes can perform this task because they operate using different scopes of analysis compared to the first interpolation pass, and therefore do not duplicate and exacerbate the artifacts that may be created in the first interpolation pass. The same principle applies with respect to the second interpolation pass vis-à-vis subsequent interpolation passes. Any artifacts created by the second interpolation pass are removed or reduced based on interpolation performed in a subsequent pass or passes. Other interpolation algorithms, by contrast, do not perform multiple-pass interpolation in the manner described above, as governed by parameter values generated by a pass-configuring component 122. Hence, these other interpolation algorithms may create artifacts in the final interpolation results. These artifacts may take the form of unwanted lines and geometric shapes that appear in the interpolation results.

Further note that the computing system 102 shown in FIG. 1 has the merit of being flexible. It is flexible insofar as its basic paradigm can be applied with respect to: a) input data having any dimensionality; b) input data obtained from different kinds of sources and/or expressed in different data formats; c) input data representing different kinds of phenomena; d) interpolation systems using different interpolation algorithms; and e) interpolation systems using different control strategies for controlling the interpolation passes based on the parameter values.

Figure 2:
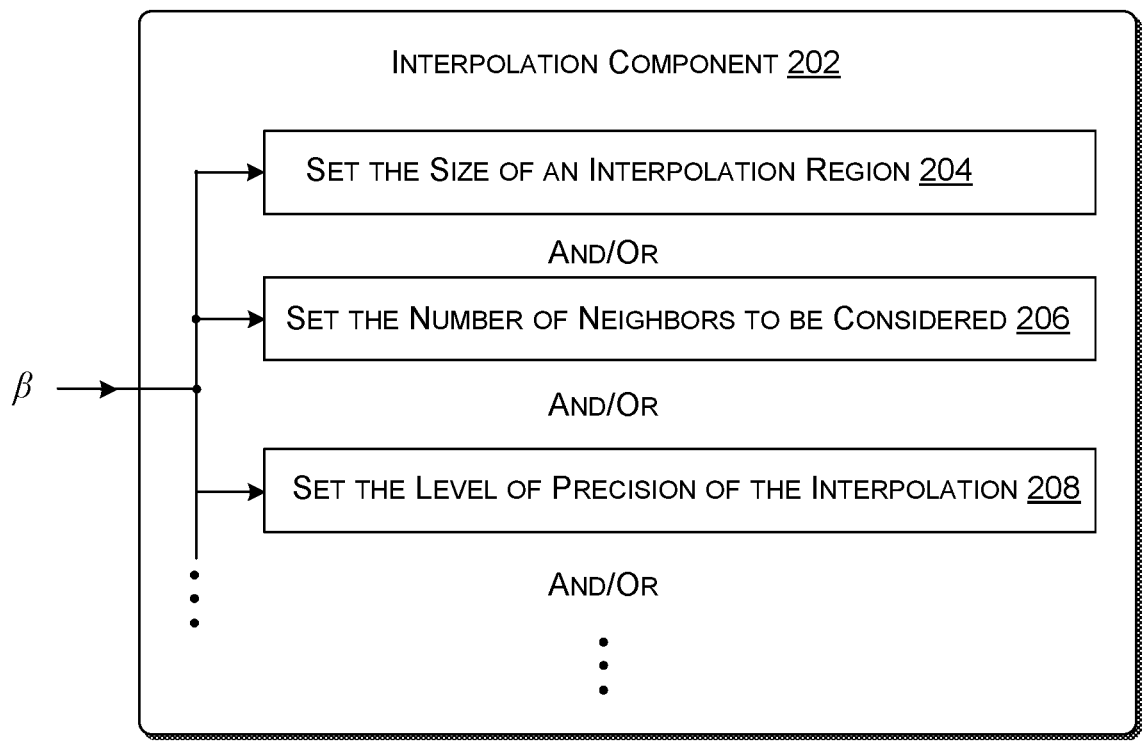
FIG. 2 shows an example of an interpolation component used in the computing system of FIG. 1, illustrating a few of the ways that a parameter value may govern the operation of the interpolation component.

Advancing to FIG. 2, this figure shows a representative interpolation component 202 that operates at a particular pass i in the pipeline of passes described above. FIG. 2 specifically summarizes different ways that the interpolation component may respond to a parameter value $\beta_i$ that is fed to it. In an actual implementation, the interpolation component 202 may use only one of these ways. FIG. 2 groups these techniques together merely to facilitate explanation. Generally, the interpolation component 202 can act on a parameter value by changing at least one setting that governs the operation of its interpolation algorithm.

Figure 3:
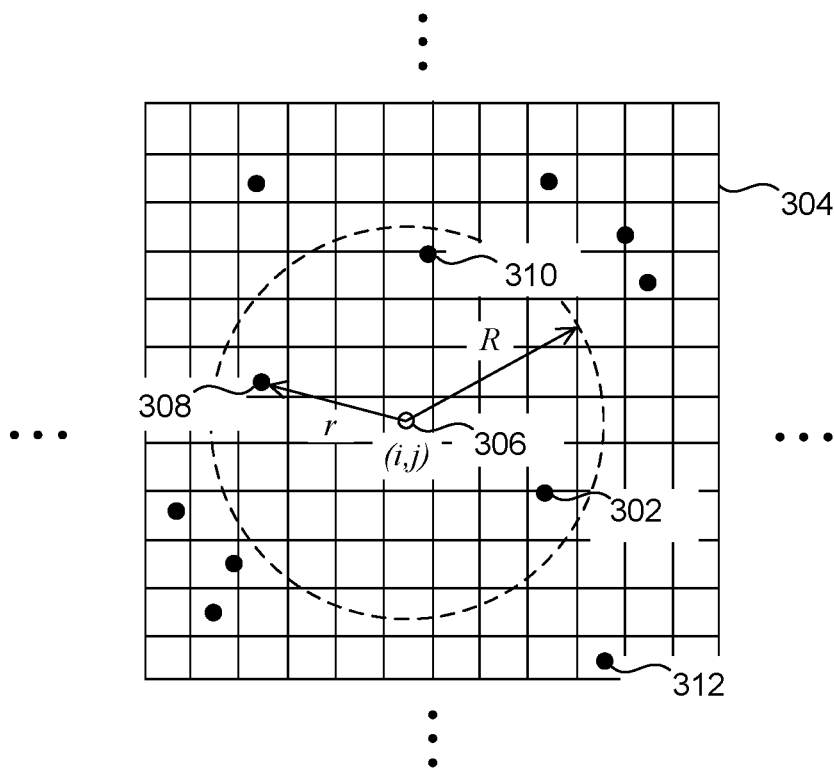
FIG. 3 shows one non-limiting way that a parameter value may govern an interpolation operation.

In a first approach 204, the interpolation component 202 may adjust a size of an interpolation region based on the parameter value. FIG. 3 shows an example of how the interpolation component 202 responds to this type of constraint. The black dots in this figure (such as representative observation 302) represent known observations ($y_1, y_2, \ldots, y_m$) provided by the input data 112. The locations of the black dots represent the coordinates (D) of the observations within a two-dimensional field 304. Note that the observations are unevenly distributed across the field 304. The grid shown in FIG. 3 defines a number of cells having respective cell locations (e.g., associated with the centers of the respective cells). The interpolation component 202 performs the task of generating interpolated values for each cell location (i, j) based, in part, on the values and locations of the known observations. At the current time, for instance, assume that the interpolation component 202 is in the process of determining the interpolated value for a particular cell location 306. To perform this task, the interpolation component 202 uses the parameter value $\beta$ to define a radius R with respect to each cell location under consideration. When performing interpolation for the representative cell location 306, the interpolation component 202 may consider only those observations that fall within the scope of analysis defined by the radius R. Here, the scope encompasses the observations 302, 308, and 310, but not the observation 312 (for instance). The first-pass interpolation component 132 (of FIG. 1) uses the largest value of R having the largest scope, while the nth-pass interpolation component 138 uses the smallest value of R. FIG. 3 shows the scope of interpolation as having a circular shape. But more generally, the interpolation component 202 can adjust the size of any volume that describes a scope of interpolation, such as a rectangular shape, etc. Moreover, in higher dimensions (e.g., three dimensions), the scope can be defined with respect to three or more dimensions, e.g., as represented by a spherical volume, a cube, etc.

To provide a yet more detailed (yet non-limiting) example of the first approach 202, assume that the interpolation system 114 of FIG. 1 uses an interpolation operation that is a modification of the Gaussian-based Barnes interpolation algorithm. More specifically, to compute an interpolated value for a cell located at a location (i, j), the interpolation operation uses a weighting function defined as:

$$W_{ijz} = e^{\frac{-r_{ijz}^2}{R^2 \beta_i}}. \tag{1}$$

In this equation, z represents an observation in the input data 112 under consideration, such as the observation 302 shown in FIG. 2. R represents the radius that defines the scope of analysis, with respect to a given pass-specific parameter value $\beta_i$. r represents the distance between the cell location (i, j) and the observation z under consideration.

The first-pass interpolation component 132 performs interpolation for the given cell location (i, j) using the equation:

$$I_1(D) = \frac{\sum_{z:|z-ij|<R_{\beta_1}} W_{ijz} y_z}{\sum_z W_{ijz}}. \tag{2}$$

In this equation, $y_z$ represents the value for observation z. The numerator of Equation (2) forms a weighted sum of these observation values within the radius defined by R, which, in turn, depends on $\beta_1$. The weighted sum in the numerator is normalized by the sum of the weights, which is computed in the denominator of Equation (2).

The second-pass interpolation component 136 of FIG. 1 performs interpolation for the given cell location (i, j) using the equation:

$$I_2(D) = I_1(D) + \frac{\sum_{z:|z-ij|<R_{\beta_2}} W_{ijz}(y_z - I_{ijz}^1)}{\sum_z W_{ijz}}. \tag{3}$$

In this equation, the difference in the numerator ($y_z - I_{ijz}^1$) represents the difference between the known value ($y_z$) at the observation z and the interpolated value at the same location that is computed on the basis of the interpolated output data ($I_{ijz}^1$) produced by the first-pass interpolation component 132. This interpolated value ($I_{ijz}^1$) at the location of observation z can be approximated using interpolation (e.g., bilinear interpolation) based on the interpolated values of points that neighbor the location of observation z. The numerator as a whole forms a weighted sum of these difference values with respect to a radius R defined by the second parameter value $\beta_2$. The radius R used by the second-pass interpolation component 136 will be smaller than the radius R used by the first-pass interpolation component 132. The result computed in the numerator is normalized by the sum of weights computed in the denominator.

The remaining passes of the interpolation system 114 repeat the analysis given by Equation (3). In each case, a pass-specific interpolation component will base its calculation on the input data 112 and the intermediate output data produced by the immediately preceding interpolation component. A variation of the above-described technique computes I(D) for each pass based on all observations in the field 304, not just those observations within the pass-specific radius R. This variation still takes into consideration the pass-specific radius R because the weighting function of Equation (1) depends on the pass-specific radius R.

Other applications of the first approach 204 can incorporate aspects of other interpolation techniques (besides Barnes interpolation). These other interpolation techniques can include: various kinds of nearest neighbor interpolation, various kinds of linear interpolation, polynomial interpolation, spline-based interpolation, Kriging interpolation, machine-trained classification-based interpolation, and so on.

Returning to FIG. 2, in a second approach 206, the interpolation component 202 may limit the maximum number of neighboring observations to be considered based on the pass-specific parameter value. For example, with reference again to FIG. 3, assume that the maximum number of neighboring observations is three. If so, the interpolation component 202 will take into consideration observations 302, 308, and 310 when determining the interpolated value for the cell location 306. This is because these are the three closest observations to the cell location 306 under consideration. The second approach can be used in conjunction with a modification of any type of interpolation technique, examples of which were provided above.

In a third approach 208, the interpolation component 202 may set the level of precision (e.g., the degree of fitting) of the interpolation algorithm at each pass based on a pass-specific parameter value $\beta$. This control strategy is based on the premise that the interpolation algorithm can capture different levels of detail for different respective precisions. One way to control the level of fitting in a polynomial or spline-based interpolation algorithm is by constraining the maximum order of polynomials that may be generated by the interpolation algorithm at each pass. In use, the interpolation system 114 can progressively increase the maximum order setting over the passes. That is, the first-pass interpolation component 132 may apply the smallest maximum degree and the nth-pass interpolation component 138 may use the largest maximum degree. This control strategy will allow the interpolation system 114 to capture increasingly detailed phenomenon in the input data 112.

Similarly, consider an interpolation algorithm that uses a random forest classification model at each pass. For each pass, the interpolation component 202 can adjust the maximum depth of the decision trees in the random forest based on a pass-specific parameter value $\beta$. More specifically, the interpolation system 114 may choose a maximum depth that progressively increases with interpolation passes. Increasing the maximum depth over the passes may allow the interpolation components in the interpolation system 114 to capture increasingly detailed phenomenon in the input data 112.

In yet another example, consider an interpolation algorithm that uses a neural network at each pass. For each pass, the interpolation component 202 can adjust the number of layers in its neural network based on a pass-specific parameter value $\beta$. More specifically, the interpolation system 114 may choose a number of levels that progressively increases with interpolation passes. Increasing the number of layers over the passes may allow the interpolation components in the interpolation system 114 to capture increasingly detailed phenomenon in the input data 112.

The above interpolation control strategies are described by way of example, not limitation. Still other control strategies, not mentioned above, are possible, including approaches that involve adjustments to various filter constraints, convolution sizes, pattern-matching settings, number of iterations performed, error thresholds, and so on. All such control settings are made with the objective of targeting particular phenomena having different characteristic scopes at different respective passes. As noted above, some control strategies may change at least one aspect of an interpolation algorithm that has a direct relation to the size of a phenomenon under consideration. This is the case in the first approach 204 described above because the size of the radius R is proportional to the size of the phenomenon that a particular interpolation pass is attempting to capture. Other control strategies govern some aspect of an interpolation algorithm that less directly maps to the size of the phenomenon under consideration. This is the case with the third approach 208 because controlling the level of precision of the interpolation algorithm may result in controlling the level of detail captured by the interpolation algorithm, but in a less explicit way compared to the first approach 204. Further note that any interpolation component can simultaneously apply two or more control strategies.

In yet other cases, the pass-configuring component 122 may choose parameters that map to respective sizes with at least some levels of error that are above a prescribed threshold level. This makes the identified sizes less reliable compared to the case in which the levels of error were below the prescribed threshold. This outcome may nevertheless be technically advantageous because it can still reduce the presence of artifacts in the output data 116. Again, this is because an interpolation performed at a subsequent pass can smooth over and thereby reduce any artifacts produced by a preceding pass.

The computing system 102 described above can be modified in different ways. In one variation, the pass-configuring component 122 can choose different parameter values irrespective of the correlation of these parameter values with different sizes of phenomena expressed in the input data 112. Here, the pass-configuring component 122 can choose the parameter values based on one or more selection factors, including the type of input data 112 under consideration, the composition of the input data 112 (e.g., as determined by the data-analyzing component 126), and so on. For example, the data-analyzing component 126 can still identify the different parts which compose the data-analyzing component 126, and the pass-configuring component 112 can use any type of mapping tool described above to map identified parts to parameter values. But the pass-configuring component 122 in this implementation provides no assurance that the different parts of the input data 112 correlate to different sizes of different phenomena. In still other implementations, the pass-configuring component can be preconfigured to choose a set of different parameter values without regard to the composition of the input data 112.

In another variation, the pass-configuring component 122 can modify the algorithms applied by the different passes, instead of, or in addition to, changing the parameter values fed to the different passes. For example, the pass-configuring component 122 can configure the passes so that two or more of the passes apply different pattern-matching logic (e.g., by using different machine-trained classification models, convolutional kernels, etc.). This will allow the different passes to detect different types of phenomena in the input data 112. Alternatively, or in addition, the pass-configuring component 122 can configure at least two of the passes to apply different interpolation methods. For example, the pass-configuring component 112 can use a nearest-neighbor technique in a first pass and the Barnes technique in a subsequent pass. Different interpolation methods have different levels of precision and accuracy associated therewith; in some implementations, the pass-configuring component 112 can assign a more precise interpolation method to a later pass of the interpolation system, relative to a preceding pass.

The variations described above retain their ability to reduce the number of artifacts in the output data 116 based on the same principle set forth above. That is, each subsequent interpolation pass is capable of reducing artifacts that may be introduced in a preceding interpolation pass (or passes). This capability stems from the fact that the different passes do not generate artifacts in the same way, and thus, the artifacts produced by any pass are blended out in subsequent passes, rather than amplified and made worse.

B. Illustrative Processes

FIGS. 4-7 show processes that explain the operation of the computing system 102 of Section A in flowchart form. Since the principles underlying the operation of the computing system 102 have already been described in Section A, certain operations will be addressed in summary fashion in this section. Each flowchart is expressed as a series of operations performed in a particular order. But the order of these operations is merely representative, and can be varied in other implementations. Further, any two or more operations described below can be performed in a parallel manner. In one implementation, the blocks shown in the flowcharts that pertain to processing-related functions can be implemented by the hardware logic circuitry described in Section C, which, in turn, can be implemented by one or more hardware processors and/or other logic units that include a task-specific collection of logic gates.

FIG. 4 shows a process 402 that represents an overview of one manner of operation of the computing system 102. In block 404, the computing system 102 receives input data 112 that includes image and/or audio content. The input data 112 further includes a set of observations produced by at least one data capture device 104. In block 406, the computing system 102 identifies plural configurations for plural respective passes of an interpolation operation based on one or more selection factors. In block 408, the computing system 102 interpolates the input data 112 in a pipeline that includes the plural passes, to produce output data 116. The plural passes use the plural respective configurations that have been identified. In block 410, the computing system 102 produces information based on the output data 116, to be presented by one or more presentation devices 108. Through the use of the plural respective configurations, interpolation performed in at least one of the plural passes reduces artifacts introduced in at least one preceding pass FIG. 5 shows a process 502 that represents one instantiation of the process 402 of FIG. 4. In block 504, the computing system 102 receives input data 112 that includes image and/or audio content. The input data 112 further includes a set of observations produced by at least one data capture device 104. In block 506, the computing system 102 identifies plural sizes associated with different respective phenomena exhibited by the input data 112. In block 508, the computing system 102 interpolates the input data in a pipeline that includes plural passes, to produce output data 116, the plural passes using plural respective parameter values to perform interpolation. More specifically, each particular pass following a first pass of the plural passes uses a particular parameter value that is associated with a smaller size compared to an immediately-preceding pass. In block 510, the computing system 102 produces information based on the output data 116, to be presented by one or more presentation devices 108. In other implementations, the processes (402, 502) of FIGS. 4 and 5 can operate on input data that does not include image or audio content, and/or does not culminate in the presentation of image or audio information.

Figure 6:
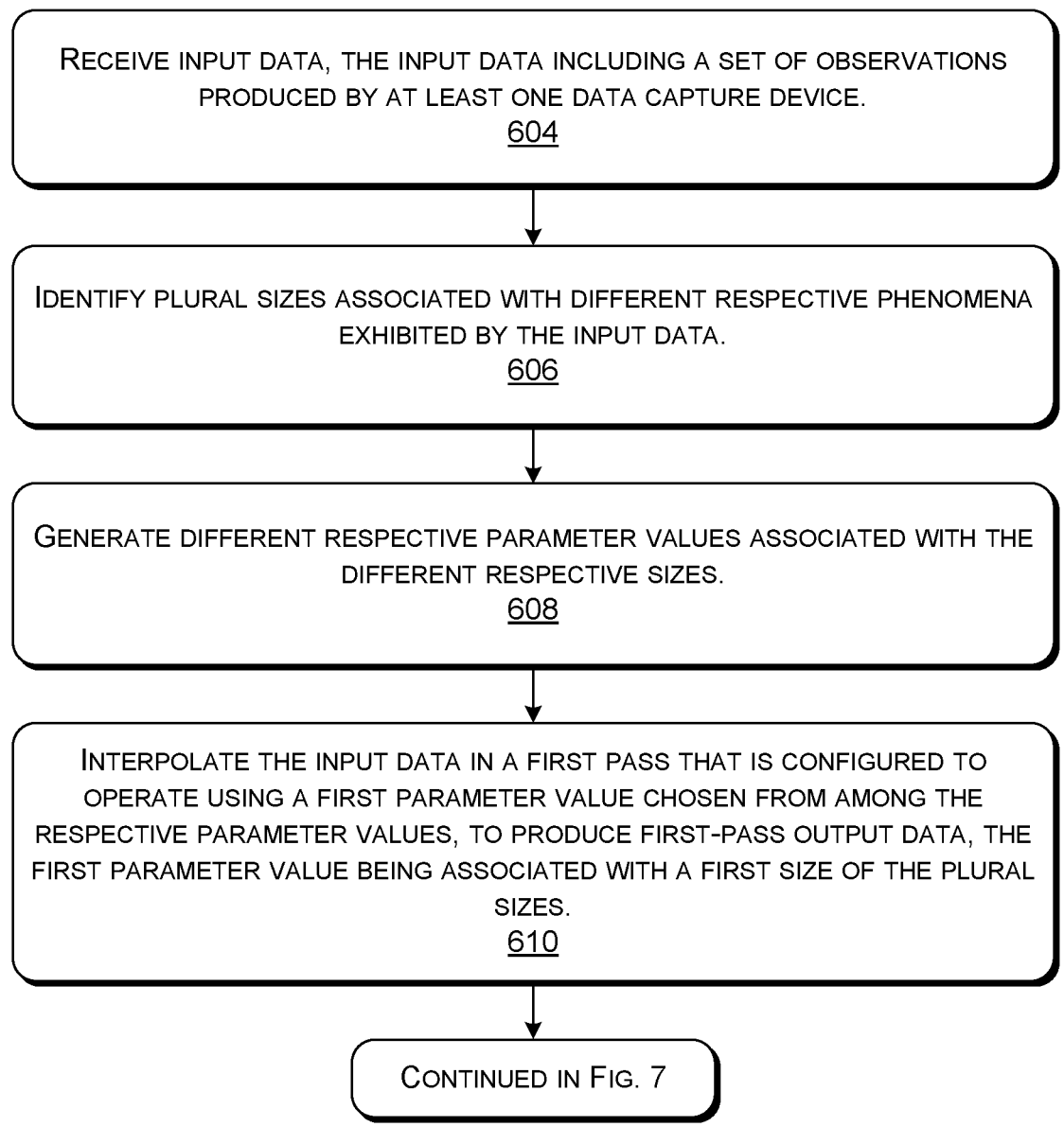
FIGS. 6 and 7 together show a process that represents one instantiation of the process of FIG. 5.
Figure 7:
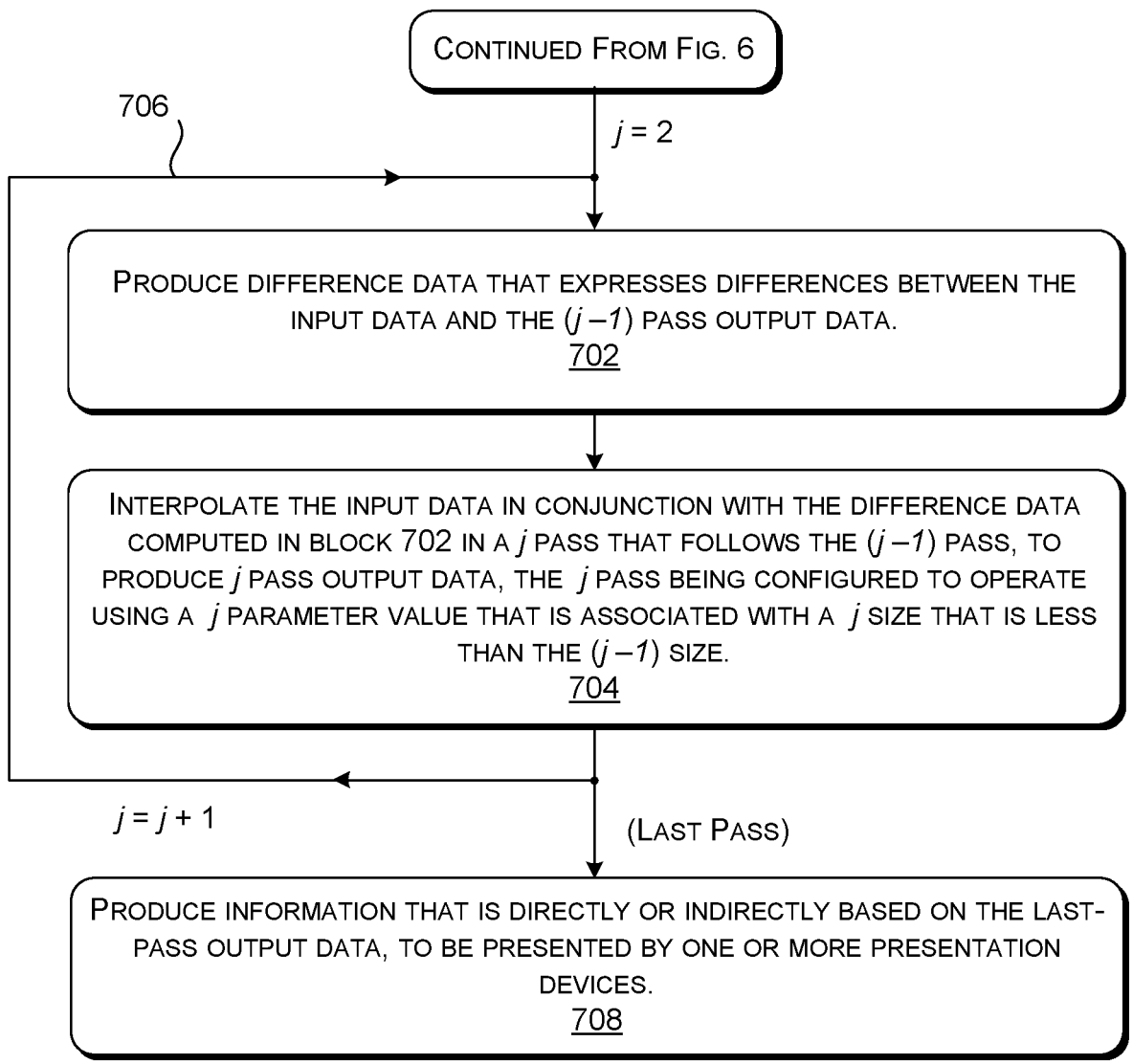

FIGS. 6 and 7 together show a process 502 that represents one instantiation of the process 502 of FIG. 5. In block 604, the computing system 102 receives input data 112 that, in some cases, includes image and/or audio content. Further, the input data 112 includes a set of observations produced by at least one data capture device 104. In block 606, the computing system 102 identifies plural sizes associated with different respective phenomena exhibited by the input data 112. In block 608, the computing system 102 generates different respective parameter values associated with the different respective sizes. In block 610, the computing system 102 interpolates the input data 112 in a first pass that is configured to operate using a first parameter value chosen from among the respective parameter values, to produce first-pass output data, the first parameter value being associated with a first size of the plural sizes. In block 702 (of FIG. 7), the computing system 102 produces difference data that expresses differences between the input data 112 and the first-pass output data. In block 704, the computing system 102 interpolates the input data 112 in conjunction with the difference data in a second pass that follows the first pass, to produce second-pass output data, the second pass being configured to operate using a second parameter value that is associated with a second size that is less than the first size. Loop 706 indicates that blocks 702 and 704 can be repeated zero, one, or more times, each pass using a different parameter value associated with a next smallest size. In block 708, the computing system 102 produces information that is directly or indirectly based on the second-pass output data, to be presented by one or more presentation devices 108.

C. Representative Computing Functionality

Figure 8:
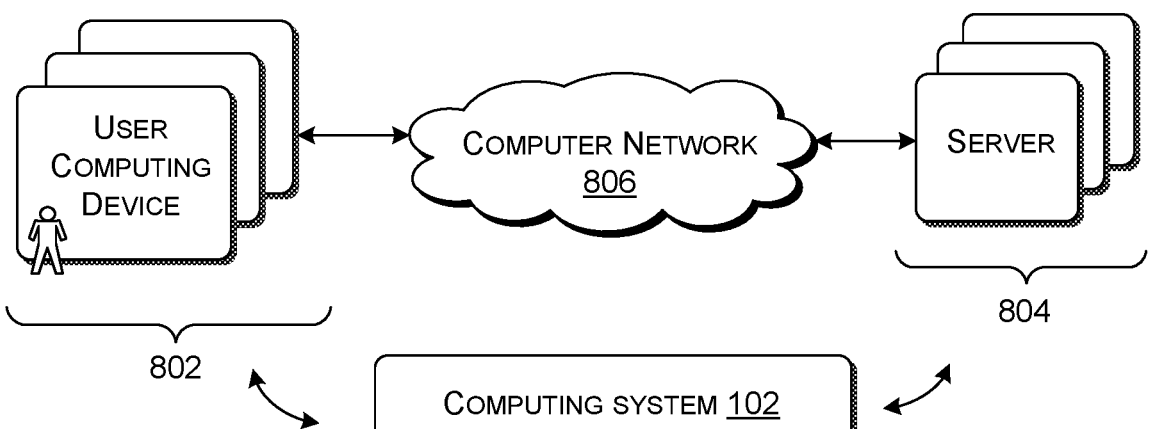
FIG. 8 shows computing equipment that can be used to implement the systems shown in FIG. 1.

FIG. 8 shows an example of computing equipment that can be used to implement the computing system 102. The computing equipment includes a set of user computing devices 802 coupled to a set of servers 804 via a computer network 806. Each user computing device can correspond to any device that performs a computing function, including a desktop computing device, a laptop computing device, a handheld computing device of any type (e.g., a smartphone, a tablet-type computing device, etc.), a mixed reality device, a wearable computing device, an Internet-of-Things (IoT) device, a gaming system, and so on. The computer network 806 can be implemented as a local area network, a wide area network (e.g., the Internet), one or more point-to-point links, or any combination thereof.

FIG. 8 also indicates that the computing system 102 can be spread across the user computing devices 802 and/or the servers 804 in any manner. For instance, in one case, the computing system 102 is entirely implemented by one or more of the servers 804, except for the presentation device(s) 108. Each user may interact with the servers 804 via a browser application or other programmatic interface provided by a user computing device. That is, the user may interact with the servers 804 for the sole purpose of receiving output data to be locally displayed by the presentation device(s) 108. In another case, the computing system 102 is entirely implemented by one or more user computing devices in local fashion, in which case no interaction with the servers 804 is necessary. In another case, the functionality associated with the computing system 102 is distributed between the servers 804 and each user computing device in any manner. For example, the servers 804 can implement the pass-configuring component 122 while each user computing device can implement a local instance of the interpolation system 114.

Figure 9:
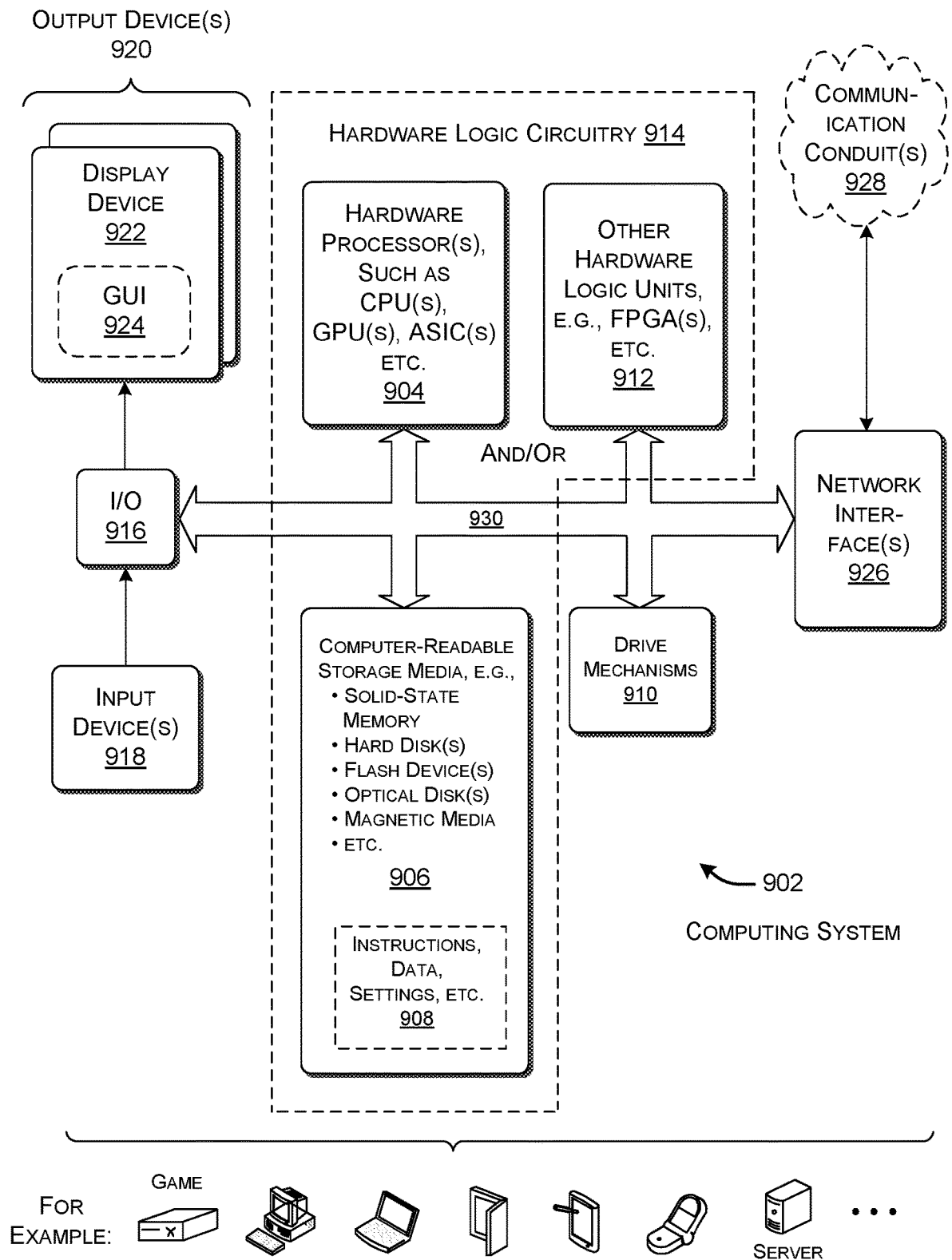
FIG. 9 shows an illustrative type of computing system that can be used to implement any aspect of the features shown in the foregoing drawings.

FIG. 9 shows a computing system 902 that can be used to implement any aspect of the mechanisms set forth in the above-described figures. For instance, the type of computing system 902 shown in FIG. 9 can be used to implement any user computing device or any server shown in FIG. 8. In all cases, the computing system 902 represents a physical and tangible processing mechanism.

The computing system 902 can include one or more hardware processors 904. The hardware processor(s) 904 can include, without limitation, one or more Central Processing Units (CPUs), and/or one or more Graphics Processing Units (GPUs), and/or one or more Application Specific Integrated Circuits (ASICs), and/or one or more Neural Processing Units (NPUs), etc. More generally, any hardware processor can correspond to a general-purpose processing unit or an application-specific processor unit.

The computing system 902 can also include computer-readable storage media 906, corresponding to one or more computer-readable media hardware units. The computer-readable storage media 906 retains any kind of information 908, such as machine-readable instructions, settings, data, etc. Without limitation, the computer-readable storage media 906 may include one or more solid-state devices, one or more magnetic hard disks, one or more optical disks, magnetic tape, and so on. Any instance of the computer-readable storage media 906 can use any technology for storing and retrieving information. Further, any instance of the computer-readable storage media 906 may represent a fixed or removable unit of the computing system 902. Further, any instance of the computer-readable storage media 906 may provide volatile or non-volatile retention of information.

More generally, any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se in transit, while including all other forms of computer-readable media.

The computing system 902 can utilize any instance of the computer-readable storage media 906 in different ways. For example, any instance of the computer-readable storage media 906 may represent a hardware memory unit (such as Random Access Memory (RAM)) for storing transient information during execution of a program by the computing system 902, and/or a hardware storage unit (such as a hard disk) for retaining/archiving information on a more permanent basis. In the latter case, the computing system 902 also includes one or more drive mechanisms 910 (such as a hard drive mechanism) for storing and retrieving information from an instance of the computer-readable storage media 906.

The computing system 902 may perform any of the functions described above when the hardware processor(s) 904 carry out computer-readable instructions stored in any instance of the computer-readable storage media 906. For instance, the computing system 902 may carry out computer-readable instructions to perform each block of the processes described in Section B.

Alternatively, or in addition, the computing system 902 may rely on one or more other hardware logic units 912 to perform operations using a task-specific collection of logic gates. For instance, the hardware logic unit(s) 912 may include a fixed configuration of hardware logic gates, e.g., that are created and set at the time of manufacture, and thereafter unalterable. Alternatively, or in addition, the other hardware logic unit(s) 912 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 9 generally indicates that hardware logic circuitry 914 includes any combination of the hardware processor(s) 904, the computer-readable storage media 906, and/or the other hardware logic unit(s) 912. That is, the computing system 902 can employ any combination of the hardware processor(s) 904 that execute machine-readable instructions provided in the computer-readable storage media 906, and/or one or more other hardware logic unit(s) 912 that perform operations using a fixed and/or programmable collection of hardware logic gates. More generally stated, the hardware logic circuitry 914 corresponds to one or more hardware logic units of any type(s) that perform operations based on logic stored in and/or otherwise embodied in the hardware logic unit(s). Further, in some contexts, each of the terms "component," "module," "engine," "system," and "tool" refers to a part of the hardware logic circuitry 914 that performs a particular function or combination of functions.

In some cases (e.g., in the case in which the computing system 902 represents a user computing device), the computing system 902 also includes an input/output interface 916 for receiving various inputs (via input devices 918), and for providing various outputs (via output devices 920). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers, gyroscopes, etc.), and so on. One particular output mechanism may include a display device 922 and an associated graphical user interface presentation (GUI) 924. The display device 922 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing system 902 can also include one or more network interfaces 926 for exchanging data with other devices via one or more communication conduits 928. One or more communication buses 930 communicatively couple the above-described units together.

The communication conduit(s) 928 can be implemented in any manner, e.g., by a local area computer network, a wide area computer network (e.g., the Internet), point-to-point connections, etc., or any combination thereof. The communication conduit(s) 928 can include any combination of hardwired links, wireless links, routers, gateway functionality, name servers, etc., governed by any protocol or combination of protocols.

FIG. 9 shows the computing system 902 as being composed of a discrete collection of separate units. In some cases, the collection of units corresponds to discrete hardware units provided in a computing device chassis having any form factor. FIG. 9 shows illustrative form factors in its bottom portion. In other cases, the computing system 902 can include a hardware logic unit that integrates the functions of two or more of the units shown in FIG. 1. For instance, the computing system 902 can include a system on a chip (SoC or SOC), corresponding to an integrated circuit that combines the functions of two or more of the units shown in FIG. 9.

The following summary provides a non-exhaustive set of illustrative examples of the technology set forth herein.

(A1) According to a first aspect, some implementations of the technology described herein include a method (e.g., the process 502) for interpolating input data (e.g., 112) containing image and/or audio content. The method includes: receiving (e.g., 504) the input data, the input data including a set of observations produced by at least one data capture device (e.g., 104); identifying (e.g., 506) plural sizes associated with different respective phenomena exhibited by the input data; and interpolating (e.g., 508) the input data in a pipeline that includes plural passes, to produce output data (e.g., 116), the plural passes using plural respective parameter values to perform interpolation. Each particular pass following a first pass of the plural passes uses a particular parameter value that is associated with a smaller size compared to an immediately-preceding pass. The method further includes producing (e.g., 510) information based on the output data, to be presented by one or more presentation devices (e.g., 108).

According to one technical characteristic, the interpolation strategy set forth in (A1) successfully blends together different details of the phenomena expressed in the input data, without allowing any level of detail obscure other levels of detail. This has the effect of capturing and preserving detail across different scopes of analysis. This has the further effect of reducing artifacts in the final output data.

(A2) According to some implementations of the method of A1, the input data has a dimensionality of one.

(A3) According to some implementations of the method of A1, the input data has a dimensionality of two.

(A4) According to some implementations of the method of A1, the input data has a dimensionality of three or more.

(A5) According to some implementations of any of the methods of A1-A4, the aforementioned each particular pass following the first pass operates by: receiving difference data that expresses differences between the input data and previous-pass output data produced by the immediately-preceding pass; and interpolating the input data in conjunction with the difference data, based on the particular parameter value associated with the particular pass.

(B1) According to a second aspect, some implementations of the technology described herein include a method (e.g., the process 602) for interpolating input data (e.g., 112) containing image and/or audio content. The method includes: receiving (e.g., 604) the input data, the input data including a set of observations produced by at least one data capture device (e.g., 104); identifying (e.g., 606) plural sizes associated with different respective phenomena exhibited by the input data; generating (e.g., 608) different respective parameter values associated with the different respective sizes; interpolating (e.g., 610) the input data in a first pass that is configured to operate using a first parameter value chosen from among the respective parameter values, to produce first-pass output data, the first parameter value being associated with a first size of the plural sizes; producing (e.g., 702) difference data that expresses differences between the input data and the first-pass output data; interpolating (e.g., 704) the input data in conjunction with the difference data in a second pass that follows the first pass, to produce second-pass output data, the second pass being configured to operate using a second parameter value that is associated with a second size that is less than the first size; and producing (e.g., 708) information that is directly or indirectly based on the second-pass output data, to be presented by one or more presentation devices (e.g., 108). The method B1 has the same technical advantages as the method A1.

(B2) According to some implementations of the method of B1, the set of observations are produced by plural data capture devices that are unevenly distributed across a geographic area.

(B3) According to some implementations of the method of B1, the set of observations describe an input image.

(B4) According to some implementations of any of the methods of B1-B3, values of at least some of the observations in the set of observations are modified, the method operating on the set of observations as modified.

(B5) According to some implementations of any of the methods of B1-B4, the operation of identifying plural sizes involves consulting a data store that provides known sizes associated the phenomena exhibited by the input data.

(B6) According to some implementations of any of the methods of B1-B4, the operation of identifying plural sizes involves using one or more data-analyzing techniques to identify components that make up the input data, each component that is identified having a particular size associated therewith (B7) According to some implementations of any of the methods of B1-B6, the method further includes: producing another instance of difference data that expresses differences between the input data and the second-pass output data; and interpolating the input data in conjunction with the other instance of difference data in a third pass that follows the second pass, to produce third-pass output data, the third pass being configured to operate using a third parameter value that is associated with a third size that is less than the second size.

(B8) According to some implementations of any of the methods of B1-B7, the method uses three or more passes, and wherein the first size is a largest size among the different respective sizes, and a last pass uses a parameter value that is associated with a smallest size among the different respective sizes.

(B9) According to some implementations of any of the methods of B1-B8, a particular parameter value, for use in a particular pass, controls a number of neighboring observations, selected from among the set of observations, to be taken into account when generating an interpolated value for a given point.

(B10) According to some implementations of any of the methods of B1-B8, a particular parameter value, for use in a particular pass, controls a size of a region within a field of the input data, to be taken into account when generating an interpolated value for a given point.

(B11) According to some implementations of any of the methods of B1-B8, a particular parameter value, for use in a particular pass, controls a level of precision applied by the particular pass when generating an interpolated value for a given point.

(B12) According to some implementations of the method of B11, the particular parameter value controls precision by determining a maximum depth of a decision tree in a decision tree-based interpolation algorithm or a maximum degree in a polynomial-based interpolation algorithm.

(C1) According to a third aspect, some implementations of the technology described herein include a method (e.g., the process 402) for interpolating input data (e.g., 112) containing image and/or audio content. The method includes: receiving (e.g., 404) the input data, the input data including a set of observations produced by at least one data capture device (e.g., 104); identifying (e.g., 406) plural configurations for plural respective passes of an interpolation operation based on one or more selection factors; interpolating (e.g., 408) the input data in a pipeline that includes the plural passes, to produce output data (e.g., 116), the plural passes using the plural respective configurations that have been identified; and producing (e.g., 410) information based on the output data, to be presented by one or more presentation devices (e.g., 108). Through the use of the plural respective configurations, interpolation performed in at least one of the plural passes reduces artifacts introduced in at least one preceding pass. The method C1 has the same technical advantages as the method A1.

(C2) According to some implementations of the method of C1, the operation of identifying plural configurations comprises: identifying plural sizes associated with different respective phenomena exhibited by the input data; and identifying plural parameter values associated with the plural sizes.

(C3) According to some implementations of the method of C2, the plural passes use the plural respective parameter values that have been identified to perform interpolation. Each particular pass following a first pass of the plural passes uses a particular parameter value that is associated with a smaller size compared to an immediately-preceding pass.

(C4) According to some implementations of the method of C3, each particular pass following the first pass operates by: receiving difference data that expresses differences between the input data and previous-pass output data produced by the immediately-preceding pass; and interpolating the input data in conjunction with the difference data, based on the particular parameter value associated with the particular pass.

(C5) According to some implementations of the method of C1, the operation of identifying plural configurations comprises identifying an interpolation algorithm to be applied in each of the plural passes, wherein at least two of the passes are assigned different interpolation algorithms.

(D1) According to a third aspect, some implementations of the technology described herein include counterparts of the methods of A1, B1, and C1 that operate on data that does not include image or audio content.

In yet another aspect, some implementations of the technology described herein include a computing system (e.g., computing system 902) for interpolating input data (e.g., 112) containing image and/or audio content. The computing system includes hardware logic circuitry (e.g., 914) that is configured to perform any of the methods described herein (e.g., any of the methods A1-A5, B1-B12, C1-C5, and D1).

In yet another aspect, some implementations of the technology described herein include a computer-readable storage medium (e.g., 906) for storing computer-readable instructions (e.g., 908). The computer-readable instructions, when executed by one or more hardware processors (e.g., 904), perform any of the methods described herein (e.g., any of the methods A1-A5, B1-B12, C1-C5, and D1).

More generally stated, any of the individual elements and steps described herein can be combined, without limitation, into any logically consistent permutation or subset. Further, any such combination can be manifested, without limitation, as a method, device, system, computer-readable storage medium, data structure, article of manufacture, graphical user interface presentation, etc. The technology can also be expressed as a series of means-plus-format elements in the claims, although this format should not be considered to be invoked unless the phrase "means for" is explicitly used in the claims.

As to terminology used in this description, the phrase "configured to" encompasses various physical and tangible mechanisms for performing an identified operation. The mechanisms can be configured to perform an operation using the hardware logic circuitry 914 of Section C. The term "logic" likewise encompasses various physical and tangible mechanisms for performing a task. For instance, each processing-related operation illustrated in the flowcharts of Section B corresponds to a logic component for performing that operation.

This description may have identified one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Further, the term "plurality" refers to two or more items, and does not necessarily imply "all" items of a particular kind, unless otherwise explicitly specified. Further, the descriptors "first," "second," "third," etc. are used to distinguish among different items, and do not imply an ordering among items, unless otherwise noted. The phrase "A and/or B" means A, or B, or A and B. Further, the terms "comprising," "including," and "having" are open-ended terms that are used to identify at least one part of a larger whole, but not necessarily all parts of the whole. Finally, the terms "exemplary" or "illustrative" refer to one implementation among potentially many implementations.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, implemented by one or more computing devices, for interpolating input data containing image and/or audio content, comprising:

receiving the input data, the input data including a set of observations produced by at least one data capture device;

determining plural sizes associated with different respective phenomena exhibited by the input data;

identifying plural configurations for plural respective passes of an interpolation operation based on the plural sizes;

interpolating the input data in a pipeline that includes the plural passes, to produce output data, the plural passes using the plural respective configurations that have been identified, wherein, through use of the plural respective configurations, interpolation performed in at least one of the plural passes reduces artifacts introduced in at least one preceding pass; and producing information based on the output data, to be presented by one or more presentation devices, wherein each particular pass following an immediately-preceding pass operates by:

receiving difference data that expresses differences between the input data and previous-pass output data produced by the immediately-preceding pass; and performing a supplemental interpolation operation on the difference data and based on a particular configuration associated with the particular pass, and combining results of the supplemental interpolation operation with the previous-pass output data.

2. The method of claim 1, wherein said identifying plural configurations comprises identifying plural parameter values associated with the plural sizes.

3. The method of claim 2, wherein the plural passes use the plural respective parameter values that have been identified to perform interpolation, said each particular pass following the immediately-preceding pass using a particular parameter value that is associated with a smaller size compared to the immediately-preceding pass.

4. The method of claim 1, wherein said identifying plural configurations comprises identifying an interpolation algorithm to be applied in each of the plural passes, wherein at least two of the passes are assigned different interpolation algorithms.

5. A computing system for interpolating input data containing image and/or audio content, comprising:

hardware logic circuitry, the hardware logic circuitry corresponding to: (a) one or more hardware processors that perform operations by executing machine-readable instructions stored in a memory, and/or (b) one or more other hardware logic units that perform the operations using a collection of logic gates, the operations including:

receiving the input data, the input data including a set of observations produced by at least one data capture device;

determining plural sizes associated with different respective phenomena exhibited by the input data;

generating different respective parameter values associated with the different respective sizes;

interpolating the input data in a first pass that is configured to operate using a first parameter value chosen from among the respective parameter values, to produce first-pass output data, the first parameter value being associated with a first size of the plural sizes;

producing difference data that expresses differences between the input data and the first-pass output data;

performing a supplemental interpolation operation on the difference data in a second pass that follows the first pass, and combining results of the supplemental interpolation operation with the first-pass output data, to produce second-pass output data, the second pass being configured to operate using a second parameter value that is associated with a second size that is less than the first size; and producing information that is directly or indirectly based on the second-pass output data, to be presented by one or more presentation devices.

6. The computing system of claim 5, wherein the set of observations are produced by plural data capture devices that are unevenly distributed across a geographic area.

7. The computing system of claim 5, wherein the set of observations describe an input image.

8. The computing system of claim 5, wherein values of at least some of the observations in the set of observations are modified, the method operating on the set of observations as modified.

9. The computing system of claim 5, wherein said determining plural sizes involves consulting a data store that provides known sizes associated the phenomena exhibited by the input data.

10. The computing system of claim 5, wherein said determining plural sizes involves using one or more data-analyzing techniques to identify components that make up the input data, each component that is identified having a particular size associated therewith.

11. The computing system of claim 5, further comprising:

producing another instance of difference data that expresses differences between the input data and the second-pass output data; and performing another supplemental interpolation operation on said another instance of difference data in a third pass that follows the second pass, and combining results of said another supplemental interpolation operation with the second-pass output data, to produce third-pass output data, the third pass being configured to operate using a third parameter value that is associated with a third size that is less than the second size.

12. The computing system of claim 5, wherein a particular parameter value, for use in a particular pass, controls a number of neighboring observations, selected from among the set of observations, to be taken into account when generating an interpolated value for a given point.

13. The computing system of claim 5, wherein a particular parameter value, for use in a particular pass, controls a size of a region within a field of the input data, to be taken into account when generating an interpolated value for a given point.

14. The computing system of claim 5, wherein a particular parameter value, for use in a particular pass, controls a level of precision applied by the particular pass when generating an interpolated value for a given point.

15. The computing system of claim 14, the particular parameter value controls precision by determining a maximum depth of a decision tree or a maximum degree in a polynomial-based interpolation algorithm.

16. A computer-readable storage medium for storing computer-readable instructions, the computer-readable instructions, when executed by one or more hardware processors, performing a method that comprises:

receiving input data;

determining plural sizes associated with different respective phenomena exhibited by the input data by automatically analyzing the input data and extracting the plural sizes from the input data;

interpolating the input data in a pipeline that includes plural passes, to produce output data, the plural passes using plural respective parameter values, associated with the plural sizes, to perform interpolation, each particular pass following a first pass of the plural passes using a particular parameter value that is associated with a smaller size compared to an immediately-preceding pass; and producing information based on the output data, to be presented by one or more presentation devices, wherein said each particular pass following the first pass operates by:

receiving difference data that expresses differences between the input data and previous-pass output data produced by the immediately-preceding pass; and performing a supplemental interpolation operation on the difference data and based on the particular parameter value associated with the particular pass, and combining results of the supplemental interpolation operation with previous-pass output data.

17. The computer-readable storage medium of claim 16, wherein the particular parameter value, for use in the particular pass, controls a size of a region within a field of the input data, to be taken into account when generating an interpolated value for a given point.

18. The method of claim 1, wherein the determining plural sizes comprises automatically analyzing the input data and extracting the plural sizes from the input data.

19. The computer-readable storage medium of claim 16, wherein the particular parameter value, for use in the particular pass, controls a duration of a phenomenon exhibited in the input data.

* * * * *